(12) United States Patent
Liu (10) Patent No.: US 12,528,609 B2
(45) Date of Patent: Jan. 20, 2026

(54) UNMANNED AERIAL VEHICLE NEST

(71) Applicant: AUTEL ROBOTICS CO., LTD., Shenzhen (CN)

(72) Inventor: Pan Liu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/760,086

(22) Filed: Jul. 1, 2024

(65) Prior Publication Data

US 2025/0002185 A1    Jan. 2, 2025

(30) Foreign Application Priority Data

Jun. 29, 2023 (CN) .......................... 202321693650.X (51) Int. Cl.
  B64U 80/70 (2023.01)
(52) U.S. Cl.
  CPC .................................. B64U 80/70 (2023.01)
(58) Field of Classification Search
  CPC ........... B64U 80/70; B64F 1/007; B64F 1/005
  See application file for complete search history.

(56) References Cited

U.S. PATENT DOCUMENTS

| | | | | |
|---|---|---|---|---|
| 3,253,806 A * | 5/1966 | Eickmann | ............... | B64C 27/12 244/17.23 |
| 3,483,696 A * | 12/1969 | Ronald | .................. | B64C 27/08 416/157 R |
| 4,262,712 A * | 4/1981 | Young | ...................... | B67D 7/54 141/DIG. 1 |
| 7,083,444 B1 * | 8/2006 | Barina | ................. | H05K 7/1409 439/372 |
| 7,334,755 B2 * | 2/2008 | Svoboda, Jr. | ........... | B64C 27/08 244/17.23 |
| 8,052,081 B2 * | 11/2011 | Olm | ....................... | B64U 10/13 244/17.23 |
| 8,245,469 B2 * | 8/2012 | Rubel | ....................... | E04B 5/48 52/223.6 |
| 8,256,172 B2 * | 9/2012 | Benson | ............. | E04F 15/02183 52/489.1 |
| 8,511,606 B1 * | 8/2013 | Lutke | ..................... | B64U 80/40 320/109 |
| 9,056,676 B1 * | 6/2015 | Wang | ........................ | B60R 9/00 |
| 9,126,693 B1 * | 9/2015 | Shi | ........................ | G05D 1/0669 |
| 9,290,277 B2 * | 3/2016 | You | ........................ | B64U 50/34 |
| 9,387,928 B1 * | 7/2016 | Gentry | ................... | B64U 50/39 |
| 9,421,869 B1 * | 8/2016 | Ananthanarayanan | | ...................... B60L 5/005 |
| 9,446,858 B2 * | 9/2016 | Hess | ........................ | B64F 3/02 |

(Continued)

*Primary Examiner* — Medhat Badawi
(74) *Attorney, Agent, or Firm* — Frank Gao, Esq.

(57) ABSTRACT

Embodiments of the utility model relate to the technical field of unmanned aerial vehicles, and in particular, to an unmanned aerial vehicle nest, which includes a nest body, where the nest body includes a lower shell and an apron, the apron is provided on the lower shell, the apron is used for parking an unmanned aerial vehicle, and the lower shell is provided with a drive opening; an upper cover, rotatably connected to the lower shell; and a drive mechanism, configured to drive the upper cover to rotate relative to the lower shell, where when the upper cover is at a first preset position, the upper cover covers the apron, and the drive mechanism makes the upper cover stay at any position in a rotation direction of the t upper cover.

10 Claims, 5 Drawing Sheets

(56) References Cited

U.S. PATENT DOCUMENTS

| | | | | |
|---|---|---|---|---|
| 9,457,899 B2* | 10/2016 | Duffy | | B64U 10/16 |
| 9,527,605 B1* | 12/2016 | Gentry | | G05D 1/0094 |
| 9,551,989 B2* | 1/2017 | Scarlatti | | G05D 1/00 |
| 9,589,448 B1* | 3/2017 | Schneider | | F41H 9/10 |
| 9,643,722 B1* | 5/2017 | Myslinski | | G05D 1/689 |
| 9,718,564 B1* | 8/2017 | Beckman | | B61L 15/0027 |
| 9,783,075 B2* | 10/2017 | Henry | | B60L 53/36 |
| 9,957,045 B1* | 5/2018 | Daly | | B64U 50/19 |
| 10,099,561 B1* | 10/2018 | Ananthanarayanan | | B60L 53/126 |
| 10,099,785 B1* | 10/2018 | Gonzalez | | B64U 50/31 |
| 10,176,722 B1* | 1/2019 | Boyd | | G08G 5/57 |
| 10,268,208 B1* | 4/2019 | Hopwood Thomas | | G05D 1/0676 |
| 10,310,501 B2* | 6/2019 | Greenberger | | H02J 7/342 |
| 10,370,122 B2* | 8/2019 | Fisher | | G05D 1/0011 |
| 10,377,507 B2* | 8/2019 | Tremblay | | G08G 5/54 |
| 10,467,685 B1* | 11/2019 | Brisson | | G06Q 10/083 |
| 10,526,094 B2* | 1/2020 | Cheng | | B64U 80/25 |
| 10,719,080 B2* | 7/2020 | Zhang | | B64F 5/60 |
| 10,745,102 B2* | 8/2020 | Nysæter | | B64U 30/20 |
| D903,576 S * | 12/2020 | Feldman | | D12/345 |
| 10,967,970 B2* | 4/2021 | Van Niekerk | | B64U 20/87 |
| 11,079,752 B1* | 8/2021 | Lombardini | | B64U 80/60 |
| 11,111,033 B1* | 9/2021 | Burks | | B64U 50/19 |
| D932,369 S * | 10/2021 | Passley | | D12/16.1 |
| 11,148,808 B2* | 10/2021 | Wiggerich | | B64U 30/26 |
| 11,279,481 B2* | 3/2022 | Burks | | H04W 4/44 |
| 11,370,561 B2* | 6/2022 | Ratajczak | | B66D 1/48 |
| 11,390,396 B2* | 7/2022 | Huang | | B64U 20/87 |
| 11,597,516 B1* | 3/2023 | Klinkmueller | | B64U 70/20 |
| 11,603,219 B2* | 3/2023 | Ratajczak | | B64D 1/10 |
| 11,636,771 B2* | 4/2023 | Barker | | B64F 1/222 701/16 |
| 11,641,966 B2* | 5/2023 | Nakanishi | | A47G 29/124 232/44 |
| 11,673,690 B2* | 6/2023 | Dayan | | B64U 70/97 244/114 R |
| 11,710,092 B2* | 7/2023 | Dearing | | G07C 9/00896 705/330 |
| 11,741,422 B2* | 8/2023 | Gil | | B65G 1/0478 705/338 |
| 11,780,606 B2* | 10/2023 | Carthew | | B64U 70/99 244/114 R |
| 11,814,191 B2* | 11/2023 | Cheng | | B64F 1/005 |
| 11,814,241 B2* | 11/2023 | Tian | | B60P 3/11 |
| 11,939,057 B2* | 3/2024 | Hamm | | B64U 20/70 |
| 11,939,080 B2* | 3/2024 | Cowden | | B64U 80/80 |
| 12,065,273 B2* | 8/2024 | Kiyokami | | B64U 10/13 |
| 12,168,533 B1* | 12/2024 | Hinman | | B64U 70/97 |
| 12,195,213 B2* | 1/2025 | Qi | | B64U 70/97 |
| 12,214,902 B2* | 2/2025 | Infanti | | G05D 1/0202 |
| 12,240,626 B2* | 3/2025 | Dolata | | B64U 10/60 |
| 2004/0256519 A1* | 12/2004 | Ellis | | B64F 1/125 244/110 E |
| 2005/0061910 A1* | 3/2005 | Wobben | | B64C 29/00 244/17.23 |
| 2005/0178894 A1* | 8/2005 | McGeer | | B64U 70/70 244/63 |
| 2006/0038067 A1* | 2/2006 | Dennis | | B64F 1/06 244/63 |
| 2006/0249622 A1* | 11/2006 | Steele | | B64U 80/20 244/115 |
| 2007/0176432 A1* | 8/2007 | Rolt | | F03D 9/255 290/55 |
| 2008/0217486 A1* | 9/2008 | Colten | | B64U 10/25 244/45 R |
| 2009/0057486 A1* | 3/2009 | Becht, IV | | B64F 1/007 244/114 R |
| 2010/0170993 A1* | 7/2010 | Misegades | | B64C 7/00 244/130 |
| 2010/0320313 A1* | 12/2010 | Hanafin | | B64F 1/125 244/114 R |
| 2011/0174925 A1* | 7/2011 | Ying | | B64F 1/005 701/16 |
| 2012/0080556 A1* | 4/2012 | Root, Jr. | | B64F 1/06 73/170.28 |
| 2013/0233964 A1* | 9/2013 | Woodworth | | B64U 10/60 244/175 |
| 2014/0124621 A1* | 5/2014 | Godzdanker | | B64F 1/125 244/110 E |
| 2014/0257595 A1* | 9/2014 | Tillmann | | B64U 10/14 701/2 |
| 2014/0319272 A1* | 10/2014 | Casado | | B60L 58/10 244/110 E |
| 2015/0069968 A1* | 3/2015 | Pounds | | B60L 53/35 320/109 |
| 2015/0123462 A1* | 5/2015 | Kamradt | | B67D 7/02 141/192 |
| 2015/0158599 A1* | 6/2015 | Sisko | | B64F 1/20 244/114 R |
| 2015/0175276 A1* | 6/2015 | Koster | | A47G 29/14 244/114 R |
| 2015/0183528 A1* | 7/2015 | Walsh | | B64C 39/024 244/114 R |
| 2015/0336669 A1* | 11/2015 | Kantor | | G01C 21/343 701/3 |
| 2015/0336677 A1* | 11/2015 | Smaoui | | H01R 24/38 320/109 |
| 2015/0363843 A1* | 12/2015 | Loppatto | | G06Q 30/0283 705/330 |
| 2016/0001883 A1* | 1/2016 | Sanz | | B64U 10/13 244/17.23 |
| 2016/0003637 A1* | 1/2016 | Andersen | | G01C 21/362 701/519 |
| 2016/0011592 A1* | 1/2016 | Zhang | | B64U 70/97 244/114 R |
| 2016/0023761 A1* | 1/2016 | McNally | | G05D 1/0094 701/3 |
| 2016/0039541 A1* | 2/2016 | Beardsley | | G05D 1/0011 701/2 |
| 2016/0068264 A1* | 3/2016 | Ganesh | | G08G 5/55 701/4 |
| 2016/0068265 A1* | 3/2016 | Hoareau | | G06Q 10/08 701/3 |
| 2016/0101856 A1* | 4/2016 | Kohstall | | G05D 1/0669 244/17.23 |
| 2016/0130000 A1* | 5/2016 | Rimanelli | | B64U 20/50 244/2 |
| 2016/0131025 A1* | 5/2016 | Pekrul | | F02B 53/10 123/205 |
| 2016/0144982 A1* | 5/2016 | Sugumaran | | B64C 25/32 244/108 |
| 2016/0185466 A1* | 6/2016 | Dreano, Jr. | | G06Q 10/083 705/26.81 |
| 2016/0194959 A1* | 7/2016 | Pekrul | | F01C 19/06 418/146 |
| 2016/0196756 A1* | 7/2016 | Prakash | | B64U 80/25 701/3 |
| 2016/0200438 A1* | 7/2016 | Bokeno | | B64C 39/024 244/2 |
| 2016/0207627 A1* | 7/2016 | Hoareau | | B64D 1/02 |
| 2016/0229299 A1* | 8/2016 | Streett | | B64F 1/222 |
| 2016/0244162 A1* | 8/2016 | Weller | | B64U 10/13 |
| 2016/0244187 A1* | 8/2016 | Byers | | A47G 29/14 |
| 2016/0257423 A1* | 9/2016 | Martin | | A47G 29/14 |
| 2016/0257426 A1* | 9/2016 | Mozer | | B64U 70/30 |
| 2016/0272317 A1* | 9/2016 | Cho | | G08G 1/162 |
| 2016/0280371 A1* | 9/2016 | Canavor | | H04W 4/029 |
| 2016/0286128 A1* | 9/2016 | Zhou | | H04N 23/698 |
| 2016/0291445 A1* | 10/2016 | Fisher, Sr. | | F16M 11/10 |
| 2016/0304198 A1* | 10/2016 | Jourdan | | G08G 5/57 |
| 2016/0304217 A1* | 10/2016 | Fisher | | B64F 1/222 |
| 2016/0307448 A1* | 10/2016 | Salnikov | | A01C 21/00 |
| 2016/0311329 A1* | 10/2016 | Rodriguez | | B60L 58/18 |
| 2016/0340006 A1* | 11/2016 | Tang | | B63C 9/01 |
| 2016/0340021 A1* | 11/2016 | Zhang | | B64C 27/006 |
| 2016/0355261 A1* | 12/2016 | Chin | | B64U 70/20 |
| 2016/0364989 A1* | 12/2016 | Speasl | | G08G 5/57 |

(56) References Cited

U.S. PATENT DOCUMENTS

| | | | | |
|---|---|---|---|---|
| 2016/0378108 | A1* | 12/2016 | Paczan | G06Q 10/083 |
| | | | | 705/330 |
| 2017/0011333 | A1* | 1/2017 | Greiner | G06K 7/10722 |
| 2017/0015415 | A1* | 1/2017 | Chan | G06Q 30/04 |
| 2017/0021941 | A1* | 1/2017 | Fisher | G05D 1/0011 |
| 2017/0021942 | A1* | 1/2017 | Fisher | B64U 70/80 |
| 2017/0023949 | A1* | 1/2017 | Fisher | G08G 5/55 |
| 2017/0050749 | A1* | 2/2017 | Pilskalns | G05D 1/0676 |
| 2017/0073085 | A1* | 3/2017 | Tremblay | B64F 1/007 |
| 2017/0081043 | A1* | 3/2017 | Jones | B64C 37/02 |
| 2017/0096222 | A1* | 4/2017 | Spinelli | B64U 80/25 |
| 2017/0117676 | A1* | 4/2017 | James | B64U 80/70 |
| 2017/0121023 | A1* | 5/2017 | High | B64D 9/00 |
| 2017/0129464 | A1* | 5/2017 | Wang | H02J 7/0045 |
| 2017/0129603 | A1* | 5/2017 | Raptopoulos | B64F 1/22 |
| 2017/0132558 | A1* | 5/2017 | Perez | G06Q 10/083 |
| 2017/0137118 | A1* | 5/2017 | Gentry | B64D 1/02 |
| 2017/0144776 | A1* | 5/2017 | Fisher | B64C 39/024 |
| 2017/0158352 | A1* | 6/2017 | Von Flotow | B64F 1/0295 |
| 2017/0158353 | A1* | 6/2017 | Schmick | B60L 53/12 |
| 2017/0174335 | A1* | 6/2017 | Malloy | B64D 35/021 |
| 2017/0190443 | A1* | 7/2017 | Fisher | B64F 1/005 |
| 2017/0203632 | A1* | 7/2017 | Westendarp | B60H 1/00378 |
| 2017/0203857 | A1* | 7/2017 | O'Toole | A47G 29/141 |
| 2017/0225782 | A1* | 8/2017 | Kohstall | B64U 30/26 |
| 2017/0225799 | A1* | 8/2017 | Selwyn | B64F 1/005 |
| 2017/0225802 | A1* | 8/2017 | Lussier | B64U 10/20 |
| 2017/0240291 | A1* | 8/2017 | Kim | H01M 16/006 |
| 2017/0247120 | A1* | 8/2017 | Miller | B64U 80/25 |
| 2017/0253349 | A1* | 9/2017 | Wang | B64U 70/97 |
| 2017/0270314 | A1* | 9/2017 | Tsybrovskyy | H04W 12/06 |
| 2017/0275025 | A1* | 9/2017 | Johnson | B64F 1/12 |
| 2017/0283090 | A1* | 10/2017 | Miller | B64U 70/97 |
| 2017/0305575 | A1* | 10/2017 | Bash | B64F 1/32 |
| 2017/0308850 | A1* | 10/2017 | Roush | G01C 21/343 |
| 2017/0316701 | A1* | 11/2017 | Gil | G06Q 10/0832 |
| 2017/0323129 | A1* | 11/2017 | Davidson | G05D 1/0234 |
| 2017/0327091 | A1* | 11/2017 | Capizzo | B60L 53/68 |
| 2017/0341769 | A1* | 11/2017 | Haberbusch | F17C 5/007 |
| 2018/0039286 | A1* | 2/2018 | Tirpak | G05D 1/042 |
| 2018/0053139 | A1* | 2/2018 | Stoman | B64U 10/70 |
| 2018/0056794 | A1* | 3/2018 | Kim | B60L 53/126 |
| 2018/0092345 | A1* | 4/2018 | Okumura | F41G 7/2253 |
| 2018/0092484 | A1* | 4/2018 | Lewis | G08G 5/54 |
| 2018/0105020 | A1* | 4/2018 | Smith | B60H 1/262 |
| 2018/0105289 | A1* | 4/2018 | Walsh | G06Q 10/083 |
| 2018/0118340 | A1* | 5/2018 | Russo | B64U 50/37 |
| 2018/0118374 | A1* | 5/2018 | Lombardini | B64F 3/02 |
| 2018/0194484 | A1* | 7/2018 | Livieratos | B64U 10/13 |
| 2018/0196418 | A1* | 7/2018 | Meier | G05D 1/0088 |
| 2018/0233055 | A1* | 8/2018 | Damnjanovic | G08G 5/57 |
| 2018/0237161 | A1* | 8/2018 | Minnick | B64U 50/37 |
| 2018/0245365 | A1* | 8/2018 | Wankewycz | B64U 10/13 |
| 2018/0265296 | A1* | 9/2018 | Beckman | B64U 70/90 |
| 2018/0295327 | A1* | 10/2018 | Yearwood | B25J 11/002 |
| 2018/0312276 | A1* | 11/2018 | Miller | B64U 10/14 |
| 2018/0319496 | A1* | 11/2018 | Zhang | B64U 20/50 |
| 2018/0327091 | A1* | 11/2018 | Burks | B64U 50/13 |
| 2018/0354649 | A1* | 12/2018 | Ortiz | G08B 13/1436 |
| 2018/0357910 | A1* | 12/2018 | Hobbs | G08G 5/54 |
| 2018/0364740 | A1* | 12/2018 | Collins | G05D 1/0088 |
| 2018/0370618 | A1* | 12/2018 | Harris | B64C 25/24 |
| 2019/0009926 | A1* | 1/2019 | Hu | B64U 70/99 |
| 2019/0016476 | A1* | 1/2019 | Scherz | H02J 7/00 |
| 2019/0023133 | A1* | 1/2019 | Renold | B60L 53/35 |
| 2019/0023416 | A1* | 1/2019 | Borko | B64F 1/222 |
| 2019/0028904 | A1* | 1/2019 | Carpenter | G08G 5/76 |
| 2019/0047462 | A1* | 2/2019 | Vijayaraghavan | B60W 30/00 |
| 2019/0055018 | A1* | 2/2019 | Bei | B64U 70/92 |
| 2019/0100108 | A1* | 4/2019 | Davis | B64U 80/84 |
| 2019/0100313 | A1* | 4/2019 | Campbell | B64U 10/14 |
| 2019/0106224 | A1* | 4/2019 | Nishikawa | B64U 50/37 |
| 2019/0108472 | A1* | 4/2019 | Sweeney | B64U 70/90 |
| 2019/0135403 | A1* | 5/2019 | Perry | B64U 10/25 |
| 2019/0152326 | A1* | 5/2019 | Nishikawa | B64U 50/19 |
| 2019/0161190 | A1* | 5/2019 | Gil | H04L 67/55 |
| 2019/0193952 | A1* | 6/2019 | Zevenbergen | B60L 53/12 |
| 2019/0217952 | A1* | 7/2019 | Zawadzki | B64D 1/02 |
| 2019/0233103 | A1* | 8/2019 | High | A47G 29/141 |
| 2019/0233107 | A1* | 8/2019 | Tian | B64C 39/12 |
| 2019/0245365 | A1* | 8/2019 | Farrahi Moghaddam | |
| | | | | B64U 10/14 |
| 2019/0256201 | A1* | 8/2019 | Plekhanov | B64U 20/40 |
| 2019/0256202 | A1* | 8/2019 | Resnick | B64U 10/13 |
| 2019/0256207 | A1* | 8/2019 | Nohmi | G05D 1/0866 |
| 2019/0258910 | A1* | 8/2019 | Stoman | G06K 19/06028 |
| 2019/0263519 | A1* | 8/2019 | Argus | B64D 31/06 |
| 2019/0270526 | A1* | 9/2019 | Hehn | B60L 53/18 |
| 2019/0283871 | A1* | 9/2019 | Wieczorek | B64U 10/60 |
| 2019/0291961 | A1* | 9/2019 | Urban | G06Q 50/40 |
| 2019/0308724 | A1* | 10/2019 | Cooper | B64U 80/25 |
| 2019/0315235 | A1* | 10/2019 | Kung | B60L 53/36 |
| 2019/0348862 | A1* | 11/2019 | Obayashi | B64U 30/21 |
| 2019/0383052 | A1* | 12/2019 | Blake | E04H 6/44 |
| 2020/0017218 | A1* | 1/2020 | Ahmad | B64D 9/00 |
| 2020/0017237 | A1* | 1/2020 | Walker | G08G 5/54 |
| 2020/0036243 | A1* | 1/2020 | Zhao | H02K 1/145 |
| 2020/0044463 | A1* | 2/2020 | Kim | B64U 10/14 |
| 2020/0055613 | A1* | 2/2020 | Miller | G05D 1/0676 |
| 2020/0062373 | A1* | 2/2020 | Liao | B64U 10/16 |
| 2020/0094957 | A1* | 3/2020 | Sohmshetty | B60P 3/11 |
| 2020/0148322 | A1* | 5/2020 | Pekrul | B63H 5/02 |
| 2020/0164957 | A1* | 5/2020 | Xu | B64D 45/00 |
| 2020/0165008 | A1* | 5/2020 | Krauss | G05D 1/0676 |
| 2020/0180940 | A1* | 6/2020 | Rainville | B64F 1/28 |
| 2020/0189731 | A1* | 6/2020 | Mistry | B64C 39/022 |
| 2020/0207484 | A1* | 7/2020 | Foggia | B64U 70/90 |
| 2020/0218287 | A1* | 7/2020 | Wang | B64U 50/34 |
| 2020/0218288 | A1* | 7/2020 | Johnson | B64U 30/26 |
| 2020/0225684 | A1* | 7/2020 | Anderson | B64U 70/95 |
| 2020/0239160 | A1* | 7/2020 | Cheng | B64U 70/99 |
| 2020/0247540 | A1* | 8/2020 | Jones | B64D 7/08 |
| 2020/0262583 | A1* | 8/2020 | Ducharme | B64U 70/30 |
| 2020/0290752 | A1* | 9/2020 | Kolosiuk | B64U 70/95 |
| 2020/0301445 | A1* | 9/2020 | Jourdan | G06K 19/06037 |
| 2020/0309489 | A1* | 10/2020 | Kadavanich | F41J 9/08 |
| 2020/0349852 | A1* | 11/2020 | DiCosola | G08G 5/55 |
| 2020/0369408 | A1* | 11/2020 | Dolata | B60L 53/16 |
| 2020/0398999 | A1* | 12/2020 | Ortiz | G07C 9/00563 |
| 2020/0406773 | A1* | 12/2020 | Lacaze | B60L 53/35 |
| 2021/0031947 | A1* | 2/2021 | Wankewycz | B60L 53/51 |
| 2021/0045564 | A1* | 2/2021 | Duckers | E06B 3/483 |
| 2021/0047055 | A1* | 2/2021 | Lee | B64F 1/22 |
| 2021/0053677 | A1* | 2/2021 | Passley | B64U 70/95 |
| 2021/0070468 | A1* | 3/2021 | Svirsky | B64U 80/25 |
| 2021/0086913 | A1* | 3/2021 | Friedman | B60L 53/30 |
| 2021/0107684 | A1* | 4/2021 | Le Lann | B64F 1/26 |
| 2021/0122495 | A1* | 4/2021 | Rezvani | B64F 1/007 |
| 2021/0125503 | A1* | 4/2021 | Henry | G05D 1/0094 |
| 2021/0237694 | A1* | 8/2021 | Hirschvogel | B60J 7/16 |
| 2021/0237899 | A1* | 8/2021 | Warwick | B64C 39/024 |
| 2021/0253242 | A1* | 8/2021 | Falk-Petersen | B64U 80/40 |
| 2021/0276735 | A1* | 9/2021 | Raptopoulos | A47G 29/141 |
| 2021/0284356 | A1* | 9/2021 | Jourdan | B64F 1/18 |
| 2021/0300591 | A1* | 9/2021 | Tian | B64F 1/007 |
| 2021/0354820 | A1* | 11/2021 | Hiller | B60L 53/12 |
| 2021/0394930 | A1* | 12/2021 | O'Toole | A47G 29/141 |
| 2022/0019247 | A1* | 1/2022 | Dayan | G05D 1/104 |
| 2022/0041279 | A1* | 2/2022 | Rowse | G05D 1/104 |
| 2022/0041299 | A1* | 2/2022 | Wankewycz | B64D 37/30 |
| 2022/0055770 | A1* | 2/2022 | O'Toole | B65G 69/003 |
| 2022/0073214 | A1* | 3/2022 | Liske | B64F 1/22 |
| 2022/0119105 | A1* | 4/2022 | Schmalzried | G05D 1/695 |
| 2022/0169401 | A1* | 6/2022 | Di Cosola | B60L 53/51 |
| 2022/0234757 | A1* | 7/2022 | Dayan | B64U 70/97 |
| 2022/0242589 | A1* | 8/2022 | Pham | G09F 27/005 |
| 2022/0380063 | A1* | 12/2022 | Shah | B64U 70/92 |
| 2023/0023246 | A1* | 1/2023 | McLaughlin | G05D 1/0088 |
| 2023/0031028 | A1* | 2/2023 | Ehasoo | B64F 1/222 |
| 2023/0088830 | A1* | 3/2023 | Kim | B64U 50/32 |
| | | | | 244/221 |
| 2023/0100169 | A1* | 3/2023 | Laczak | B64F 1/125 |
| | | | | 232/1 R |

(56) References Cited

U.S. PATENT DOCUMENTS

| | | | |
|---|---|---|---|
| 2023/0202682 A1* | 6/2023 | Kiyokami | B64U 70/90 244/114 R |
| 2023/0202691 A1* | 6/2023 | Kiyokami | B64U 70/93 244/114 R |
| 2024/0278946 A1* | 8/2024 | Roberts | B64U 10/16 |
| 2024/0336378 A1* | 10/2024 | Neate | B64U 70/50 |
| 2024/0391616 A1* | 11/2024 | Dayan | B64U 70/90 |
| 2025/0002185 A1* | 1/2025 | Liu | B64U 80/70 |
| 2025/0026509 A1* | 1/2025 | Infanti | B64U 70/50 |

\* cited by examiner

UNMANNED AERIAL VEHICLE NEST

CROSS REFERENCE TO RELATED DISCLOSURE

This application is filed based upon and claims priority to Chinese patent application 202321693650.X, filed on Jun. 29, 2023 and entitled "Unmanned aerial vehicle nest," the entire disclosure of which is incorporated herein by reference for all purposes.

RELATED ART

An unmanned aerial vehicle nest is a device for storing and taking off and landing of unmanned aerial vehicles, and provides a safe and convenient base for unmanned aerial vehicles. In the existing technology, the unmanned aerial vehicle nest includes a lower shell, an apron, an upper cover and a drive mechanism. The apron is provided on the lower shell. The apron is used for parking the unmanned aerial vehicle. The upper cover is rotatably provided on the lower shell. The drive mechanism includes a drive motor and a transmission component. The drive motor is arranged on the lower shell. A drive shaft of the drive motor is connected to the transmission component. The transmission component is connected to the upper cover. The drive motor drives the transmission component. The transmission component drives the upper cover to rotate relative to the lower shell.

However, in the process of implementing the embodiments of the utility model, the inventor discovered: When the unmanned aerial vehicle is parked on the apron, the drive motor drives the transmission component and the transmission component drives the upper cover to rotate relative to the lower shell, thus physically isolating the unmanned aerial vehicle to provide safety measures and reduce access or damage by unauthorized personnel, and avoid the unmanned aerial vehicle from even being stolen. However, when the unmanned aerial vehicle nest has a power outage or the drive motor fails, the upper cover cannot be opened, making it difficult to take out the unmanned aerial vehicle parked on the apron.

SUMMARY

Embodiments of the utility model relate to the technical field of unmanned aerial vehicles, and in particular, to an unmanned aerial vehicle nest.

An embodiment of the utility model provides an unmanned aerial vehicle nest. When the unmanned aerial vehicle nest has a power outage or a drive motor fails, an upper cover can be opened to take out or fly the unmanned aerial vehicle parked on the apron.

According to a first aspect of the present disclosure, An unmanned aerial vehicle nest is provided, including a nest body, where the nest body includes a lower shell and an apron, where the apron is provided on the lower shell, the apron is used for parking an unmanned aerial vehicle, and the lower shell is provided with a drive opening; an upper cover, rotatably connected to the lower shell; and a drive mechanism, configured to drive the upper cover to rotate relative to the lower shell, where when the upper cover is at a first preset position, the upper cover covers the apron, and the drive mechanism makes the upper cover stay at any position in a rotation direction of the upper cover.

BRIEF DESCRIPTION OF THE DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTIONS OF REFERENCE NUMERALS

A1. Unmanned aerial vehicle nest;
100. Nest body; 110. Lower shell; 120. Apron; 130. Bracket; 140. Connecting sleeve; 150. First bearing; 111. Drive opening; 141. Limiting hole; 142. Sleeve through cavity;
200. Upper cover;
300. Drive mechanism; 310. Drive motor; 320. Transmission component; 311. Motor shell; 312. Drive shaft; 321. Transmission shaft; 322. Worm gear; 323. Worm screw; 324. Flange piece; 325. Fixed collar; 326. Latch; 327. Second bearing; 328. Third bearing; 3121. Fitting structure; 3211. Insertion hole; 3241. Through cavity; 3242. Third through hole; 3251. First through hole; 3252. Screw hole; 3261. Latch rod; 3262. Latch cap; 3263. Bolt; and 326A. Second through hole.

DETAILED DESCRIPTION

For ease of understanding the utility model, the utility model is described in more detail below with reference to the accompanying drawings and specific embodiments. It should be noted that, when a component is expressed as "being fastened to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions used in this specification are merely used for an illustrative purpose.

Unless otherwise defined, meanings of all technical and scientific terms used in this specification are the same as that usually understood by a person skilled in the technical field to which the utility model belongs. In the specification, terms used in the specification of the utility model are merely intended to describe objectives of the specific embodiments, but are not intended to limit the utility model. A term "and/or" used in this specification includes any or all combinations of one or more related listed items.

Figure 1:
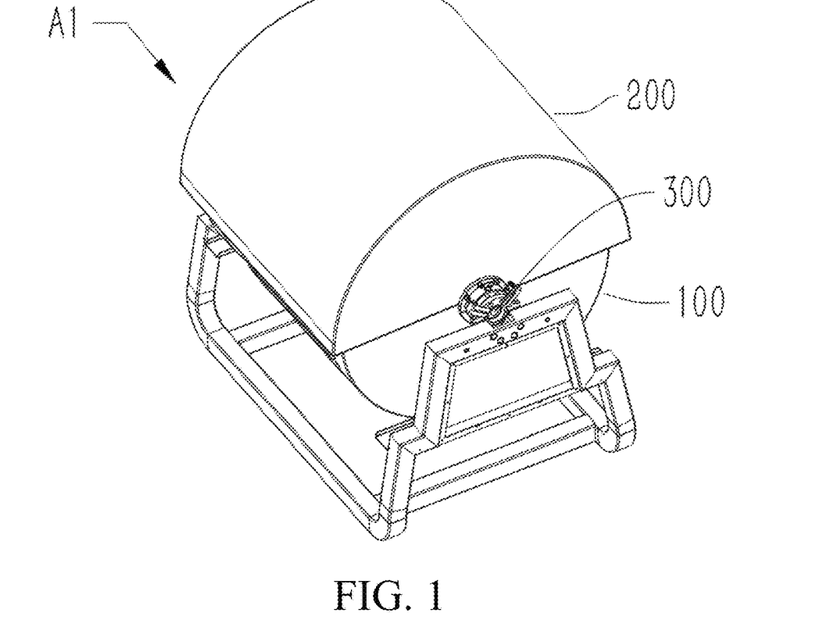
FIG. 1 is a view of an unmanned aerial vehicle nest according to an embodiment of the utility model.

Referring to FIG. 1, an unmanned aerial vehicle nest A1 is shown. The unmanned aerial vehicle nest A1 is used for parking unmanned aerial vehicles, and provides a safe and convenient base for unmanned aerial vehicles. An unmanned aerial vehicle communicates wirelessly with the unmanned aerial vehicle nest A1 on the ground. The unmanned aerial vehicle nest A1 receives user mission instructions, updates routes, transmits data, or the like, allowing an unmanned aerial vehicle to carry out long-term cruising or multi-task operations and reducing the need for manual intervention to enable autonomous management and dispatch of unmanned aerial vehicles.

Figure 2:
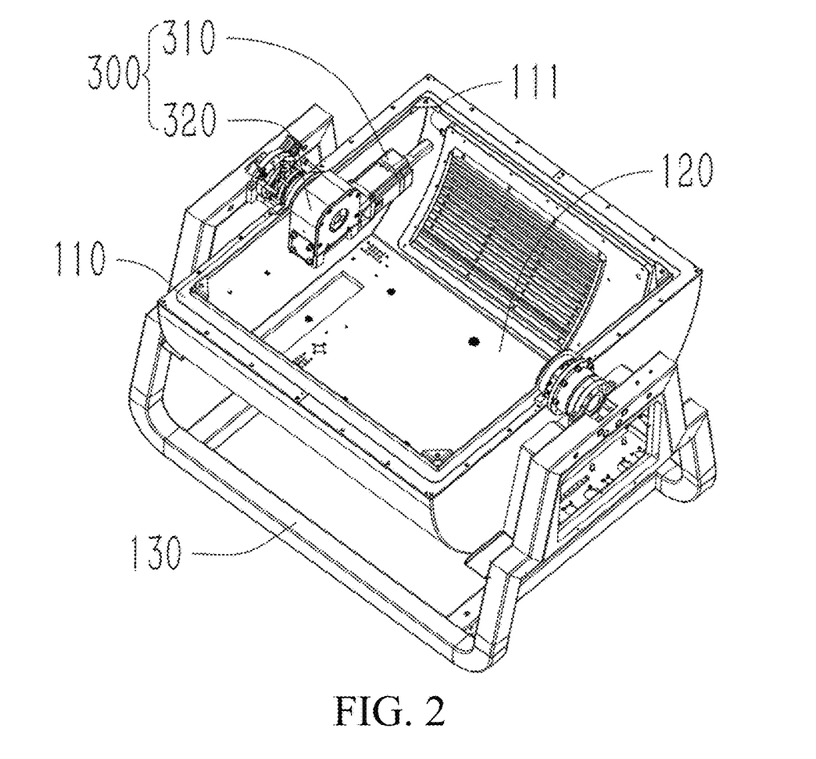
FIG. 2 is a view of an apron of an unmanned aerial vehicle nest in an open state according to an embodiment of the utility model.
Figure 3:
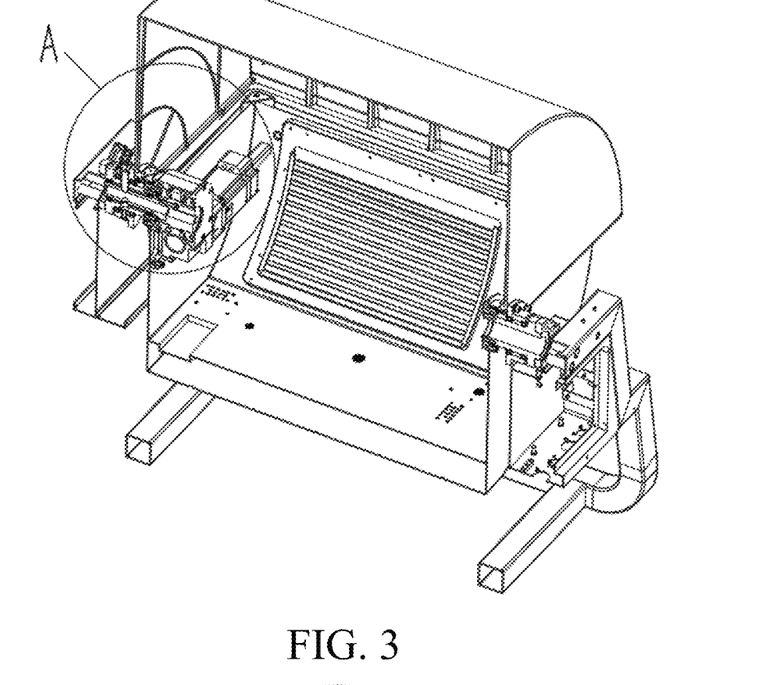
FIG. 3 is a cross-sectional view of an unmanned aerial vehicle nest according to an embodiment of the utility model.

For the unmanned aerial vehicle nest A1, refer to FIG. 1 and FIG. 2. The unmanned aerial vehicle nest A1 includes a nest body 100, an upper cover 200 and a drive mechanism 300. The nest body 100 includes a lower shell 110 and an apron 120. The apron 120 is provided on the lower shell 110. The apron 120 is used for parking the unmanned aerial vehicle. The drive mechanism 300 includes a drive motor 310 and a transmission component 320. The drive motor 310 is provided on the lower shell 110. A first end of a drive shaft 312 of the drive motor 310 is connected to the transmission component 320, and the transmission component 320 is connected to the upper cover 200. The drive motor 310 drives the transmission component 320, and the transmission component 320 drives the upper cover 200 to rotate relative to the lower shell 110. When the unmanned aerial vehicle is parked on the apron 120, the drive motor 310 drives the transmission component 320 to rotate, and the transmission component 320 drives the upper cover 200 to rotate relative to the lower shell 110, so that the upper cover 200 is located at a first preset position. The upper cover 200 covers the apron 120, and the apron 120 is in a closed state. As shown in FIG. 1, the unmanned aerial vehicle nest A1 is in a closed state. When the unmanned aerial vehicle receives a flight instruction, the drive motor 310 drives the transmission component 320 to rotate, and the transmission component 320 drives the upper cover 200 to rotate relative to the lower shell 110, so that the upper cover 200 is located at a second preset position, the apron 120 is exposed to the outside, and the apron 120 is in an open state, and as shown in FIG. 2, the unmanned aerial vehicle nest A1 is in an open state. The drive motor 310 includes a motor shell 311, a rotor (not shown), a stator (not shown) and a drive shaft 312. As shown in FIG. 3, the motor shell 311 is fastened to the lower shell 110, the rotor and the stator are both arranged on the motor shell 311, and the drive shaft 312 is connected to the rotor. A first end of the drive shaft 312 is an end close to the transmission component 320, and a second end of the drive shaft 312 is an end far away from the transmission component 320.

For the lower shell 110, refer to FIG. 2. The lower shell 110 is provided with a drive opening 111, and an end portion of the second end of the drive shaft 312 is provided with a fitting structure 3121. The fitting structure 3121 faces the drive opening 111, and the fitting structure 3121 corresponds to the drive opening 111. When the drive motor 310 fails or has a power outage, the user can use a manual handle to pass through the drive opening 111 to fit with the fitting structure 3121, or the manual handle can fit with the fitting structure 3121 of the drive shaft 312 to rotate the drive shaft 312. The transmission component 320 drives the upper cover 200 to rotate relative to the lower shell 110, the apron 120 is exposed to the outside, and the apron 120 is in an open state, making it convenient for the user to take out or fly the unmanned aerial vehicle out of the unmanned aerial vehicle nest A1. The manual handle extends into the unmanned aerial vehicle nest A1 through the drive opening 111, so that the rotation of the manual handle can drive the transmission component 320 to rotate, and then drive the upper cover 200 to rotate. Even when the unmanned aerial vehicle nest A1 has a power outage, the upper cover 200 can still be opened or locked to ensure the safety performance of the unmanned aerial vehicle nest A1. Specifically, the fitting structure 3121 at the second end of the drive shaft 312 may be square or polygonal, or provided with a slot, or the like. The manual handle is a corresponding groove matching the fitting structure 3121 at the second end of the drive shaft 312. If the fitting structure 3121 is square, the manual handle is a square groove. If the fitting structure is a corresponding polygon, the manual handle is a corresponding polygonal groove. If the fitting structure 3121 is provided with a slot, the groove of the manual handle is provided with a protrusion or another structure that matches the slot.

Figure 4:
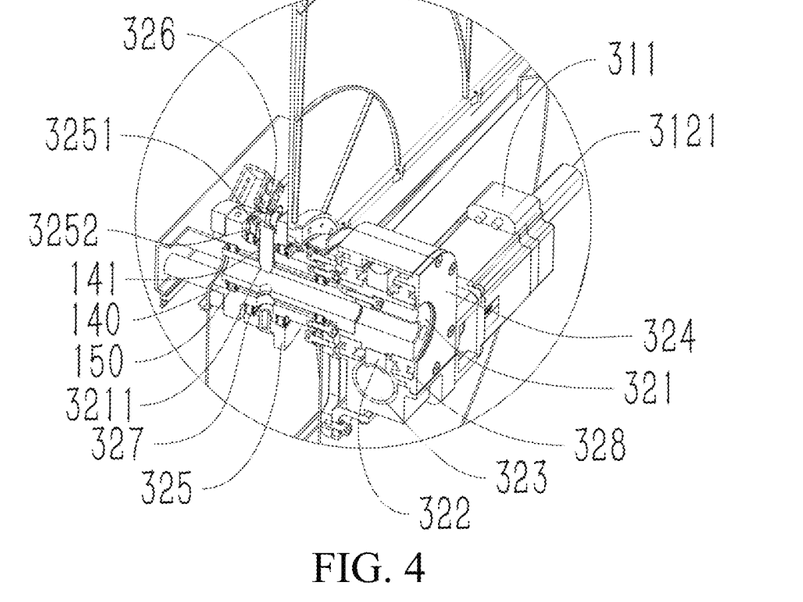
FIG. 4 is an enlarged view of part A of FIG. 3 of an unmanned aerial vehicle nest according to an embodiment of the utility model.
Figure 5:
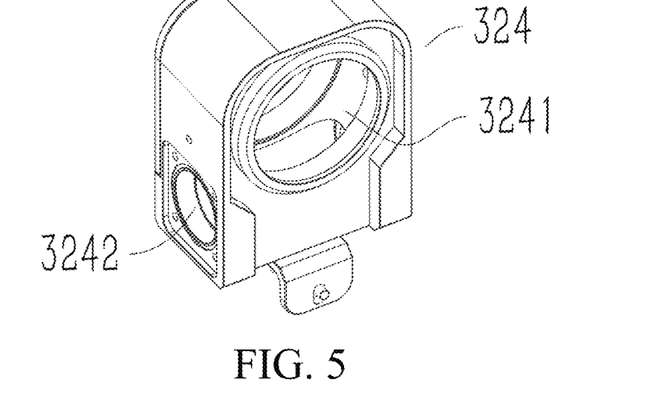
FIG. 5 is a view of a flange piece of an unmanned aerial vehicle nest according to an embodiment of the utility model.

For the lower shell 110, refer to FIG. 4 and FIG. 5. The lower shell includes a flange piece 324, and the drive motor 310 is fastened to the flange piece 324. The flange piece 324 is provided with a through cavity 3241 and a third through hole 3242, and the through cavity 3241 is connected to the third through hole 3242.

Figure 6:
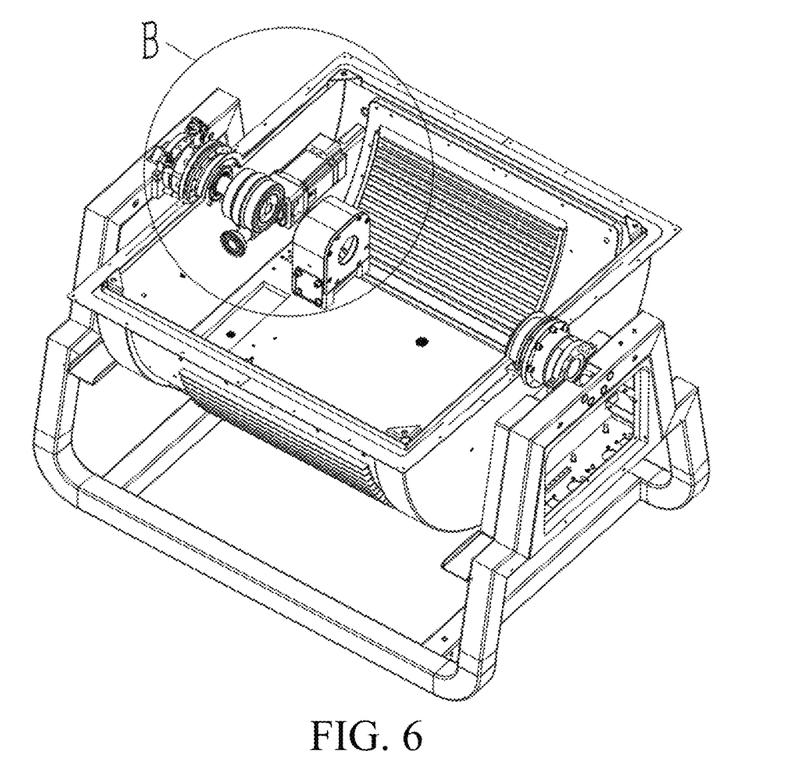
FIG. 6 is an exploded view of an unmanned aerial vehicle nest from one perspective according to an embodiment of the utility model.
Figure 7:
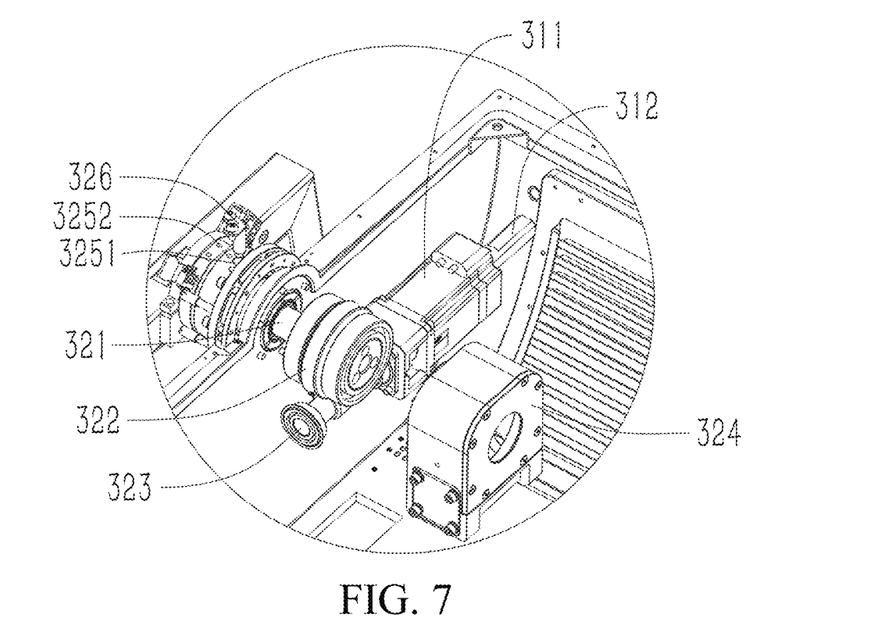
FIG. 7 is an enlarged view of part B of FIG. 6 of an unmanned aerial vehicle nest according to an embodiment of the utility model.

For the transmission component 320, refer to FIG. 4, FIG. 6 and FIG. 7. The transmission component 320 adopts a worm gear and worm screw transmission method. This transmission method has a simple structure and occupies little space. The worm gear and worm screw transmission method has advantages such as a large transmission ratio, a self-locking function, high transmission efficiency, and a compact structure. The transmission component 320 includes a transmission shaft 321, a worm gear 322 and a worm screw 323. The drive motor 310 is fastened on an extended surface of a hole opening of the third through hole 3242. The worm gear 322 is received in the through cavity 3241. The transmission shaft 321 is inserted into the through cavity 3241 and then is fixedly connected to the worm gear 322. One end of the worm screw 323 is connected to the drive shaft 312 of the drive motor 310. The other end of the worm screw 323 is inserted into the third through hole 3242, and the worm gear 322 is engaged with the worm screw 323. When the drive motor 310 rotates, the drive shaft 312 of the drive motor 310 drives the worm screw 323 to rotate, and the worm screw 323 drives the worm gear 322 and the transmission shaft 321 to rotate synchronously, causing the upper cover 200 to rotate relative to the lower shell 110. It is worth mentioning that the transmission component 320 has a self-locking function. When the upper cover 200 rotates to any position along the rotation direction and the drive motor 310 stops rotating, the upper cover 200 can remain in this position to avoid movement caused by external force or gravity. When the upper cover 200 is in the locked position, if external force is applied to the upper cover 200, the upper cover 200 cannot rotate relative to the lower shell 110, thereby realizing the anti-theft function. Since the transmission component 320 has a large transmission ratio, the rotation speed of the worm gear 322 is slow, and the upper cover 200 rotates smoothly relative to the lower shell 110, thereby reducing the risk of impact or vibration during the transmission process.

Figure 8:
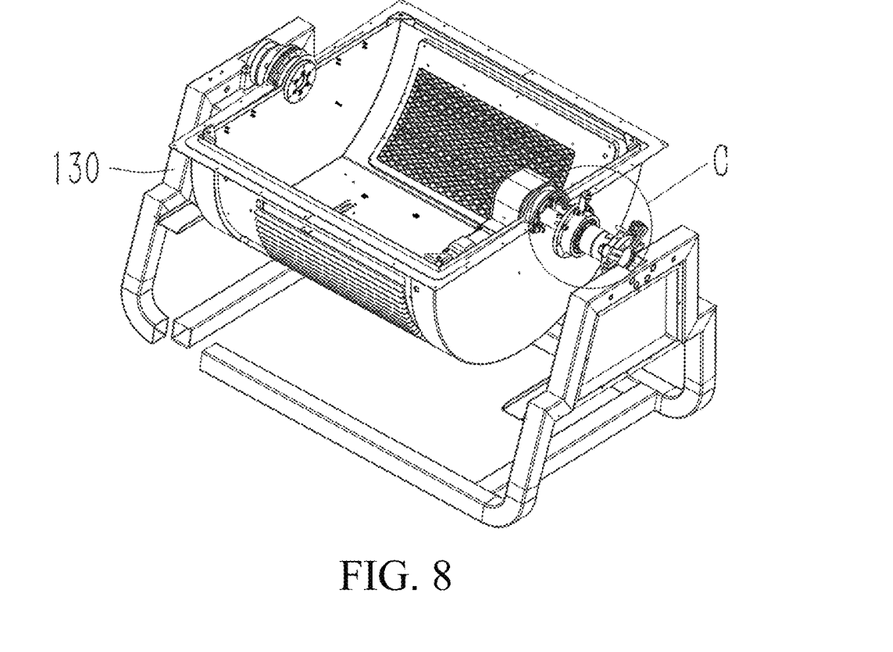
FIG. 8 is an exploded view of an unmanned aerial vehicle nest from another perspective according to an embodiment of the utility model.
Figure 9:
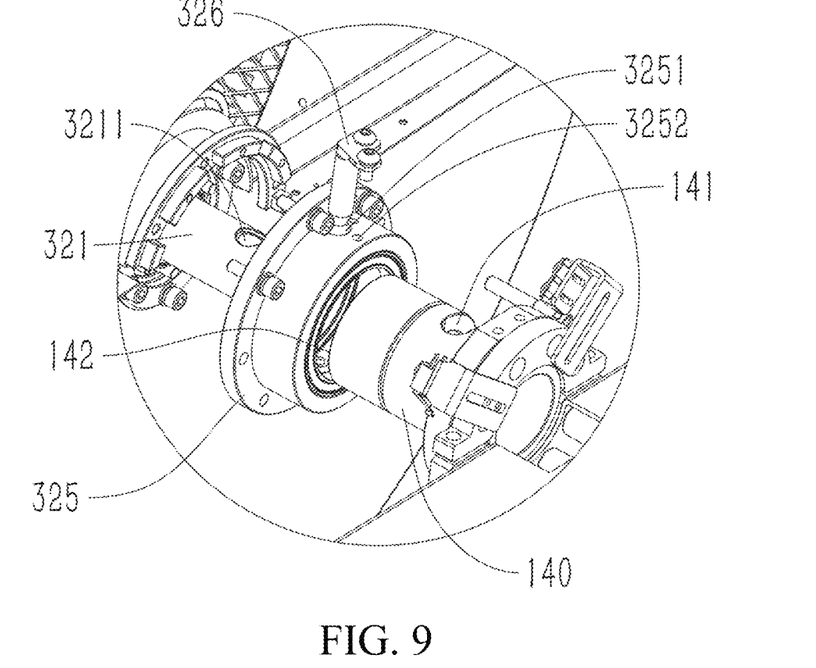
FIG. 9 is an enlarged view of part C of FIG. 8 of an unmanned aerial vehicle nest according to an embodiment of the utility model.

For the nest body 100, refer to FIG. 4, FIG. 8 and FIG. 9. The nest body 100 includes a bracket 130, a connecting sleeve 140 and a first bearing 150. Two ends of the connecting sleeve 140 are fastened to the lower shell 110 together with the bracket 130 respectively. The connecting sleeve 140 is provided with a sleeve through cavity 142. There are two first bearings 150, and the two first bearings 150 are received in the sleeve through cavity 142 and the two first bearings 150 are spaced apart between the connecting sleeve 140 and the transmission shaft 321. An inner ring of the first bearing 150 is sleeved on the transmission shaft 321, and the connecting sleeve 140 is sleeved on an outer ring of the first bearing 150, to realize the rotation of the transmission shaft relative to the lower shell 110. The bracket 130 raises the lower shell 110 above the ground so that the apron 120 is suspended in the air, thereby reducing the risk of the apron 120 coming into contact with rainwater on the ground and increasing the safety of parking the unmanned aerial vehicle.

For the connecting sleeve 140, refer to FIG. 4, FIG. 8 and FIG. 9. The connecting sleeve 140 includes a limiting hole 141, and the transmission shaft 321 is provided with an insertion hole 3211. The transmission component 320 further includes a fixed collar 325 and a latch 326. As shown in FIG. 4, the fixed collar 325 is fixedly connected to the upper cover 200. The fixed connection method may be that the fixed collar 325 and the upper cover 200 are fixedly connected by bolts, the fixed collar 325 is sleeved on the connecting sleeve 140, and the latch 326 is configured to fasten the fixed collar 325 so that the upper cover 200 and the transmission shaft 321 rotate synchronously. Specifically, one end of the latch 326 passes through the limiting hole 141 of the connecting sleeve 140 and is then inserted into the insertion hole 3211 of the transmission shaft 321 to realize the synchronous rotation of the transmission shaft 321, the connecting sleeve 140 and the fixed collar 325, further realizing the synchronous rotation of the upper cover 200 and the transmission shaft 321. The other end of the latch 326 is fixedly connected to the fixed collar 325. The fixed connection method may be that the latch 326 and the fixed collar 325 are fixedly connected through bolts, thereby reducing the risk of falling off during synchronous rotation of the transmission shaft 321, the connecting sleeve 140 and the fixed collar 325.

For the transmission component 320, refer to FIG. 4. The transmission component 320 further includes a second bearing 327. There are two second bearings 327. The two second bearings 327 are arranged at intervals, the two second bearings 327 are located at two ends of the fixed collar 325, an inner ring of the second bearing 327 is sleeved on the connecting sleeve 140, and the fixed collar 325 is sleeved on an outer ring of the second bearing 327.

Figure 10:
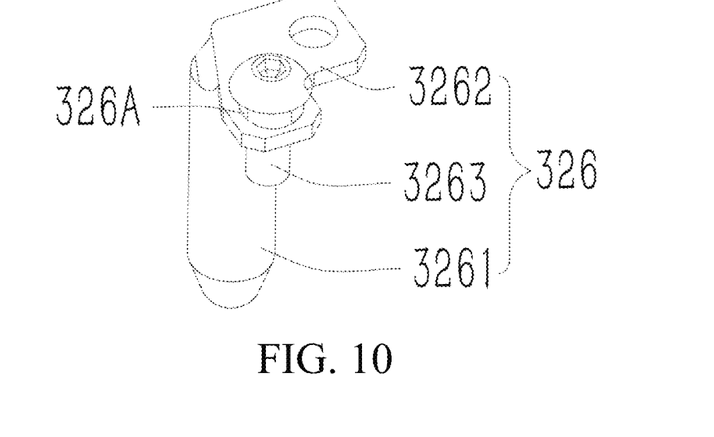
FIG. 10 is a view of a latch of an unmanned aerial vehicle nest according to an embodiment of the utility model.

For the fixed collar 325, refer to FIG. 4, FIG. 8 and FIG. 9. The fixed collar 325 is provided with a first through hole 3251 and a screw hole 3252. The latch 326 includes a latch rod 3261, a latch cap 3262 and a bolt 3263. As shown in FIG. 10, the latch cap 3262 is fastened to one end of the latch rod 3261. The latch cap 3262 is provided with a second through hole 326A. The latch rod 3261 sequentially passes through the first through hole 3251 of the fixed collar 325 and the limiting hole 141 of the connecting sleeve 140, and then is inserted into the insertion hole 3211. The bolt 3263 passes through the second through hole 326A of the latch cap 3262 and is then screwed to the screw hole 3252 of the fixed collar 325, so that the latch 326 is detachable, which can remove the restriction on the synchronous rotation of the upper cover 200 and the transmission shaft. This facilitates the disassembly and maintenance of the unmanned aerial vehicle nest A1.

For the transmission component 320, refer to FIG. 1. The transmission component 320 also includes two third bearings 328. The two third bearings 328 are arranged at intervals. The worm gear 322 and the two third bearings 328 are both received in the through cavity 3241. The two third bearings 328 are located at two ends of the worm gear 322. The inner ring of the third bearing 328 is sleeved on the transmission shaft 321. The outer ring of the third bearing 328 abuts against the inner wall surface of the flange piece 324. The diameter of the outer ring of the third bearing 328 is larger than the outer diameter of the worm gear 322 so that the worm gear 322 is suspended in the through cavity and the risk of contact between the worm gear 322 and the inner wall surface of the flange piece 324 is reduced.

The following is a detailed description of the working principle of the unmanned aerial vehicle Nest A1: When the unmanned aerial vehicle receives a flight instruction, the drive shaft 312 of the drive motor 310 drives the worm screw 323 to rotate, and the worm screw 323 drives the worm gear 322 and the transmission shaft 321 to rotate synchronously, so that the upper cover 200 rotates relative to the lower shell 110, the upper cover 200 is located at the second preset position, the apron 120 is exposed to the outside world, the apron 120 is in an open state, and the unmanned aerial vehicle drives out of the apron 120 to perform the flight mission. After the flight mission of the unmanned aerial vehicle is completed, the unmanned aerial vehicle is parked on the apron 120. The drive shaft 312 of the drive motor 310 drives the worm screw 323 to rotate. The worm screw 323 drives the worm gear 322 and the transmission shaft 321 to rotate synchronously, so that the upper cover 200 rotates relative to the lower shell 110. The upper cover 200 is located at the first preset position, the upper cover 200 covers the apron 120, and the apron 120 is in a closed state.

The technical effects of the embodiments of the present disclosure are as follows: When the unmanned aerial vehicle nest A1 has a power outage or the drive motor 310 fails, the user can use a manual handle to pass through the drive opening 111 to fit with the fitting structure 3121, to rotate the drive shaft 312. The transmission component 320 drives the upper cover 200 to rotate relative to the lower shell 110, the apron 120 is exposed to the outside, and the apron 120 is in an open state, making it convenient for the user to take out or fly the unmanned aerial vehicle.

Optionally, the drive mechanism includes a drive motor and a transmission component, where the drive motor is provided in the lower shell, a first end of a drive shaft of the drive motor is connected to the transmission component, a second end of the drive shaft of the drive motor extends away from the transmission component, the second end of the drive shaft of the drive motor corresponds to the drive opening, the transmission component is connected to the upper cover, and the drive motor is configured to drive the transmission component to rotate, so that the transmission component drives the upper cover to rotate relative to the lower shell.

Optionally, an end portion of the second end of the drive shaft of the drive motor is provided with a fitting structure, and the fitting structure is configured to fit with a manual handle to drive the transmission component to move.

Optionally, the lower shell includes a flange piece; and the transmission component includes a transmission shaft, a worm gear and a worm screw, the transmission shaft is rotatably connected to the flange piece, the worm gear is fastened to the transmission shaft, the upper cover is fastened to the transmission shaft, the worm screw is fastened to an end of the drive shaft of the drive motor, and the worm gear meshes with the worm screw.

Optionally, the nest body includes a bracket, a connecting sleeve and a first bearing, two ends of the connecting sleeve are connected to the bracket and the lower shell respectively, an inner ring of the first bearing is sleeved on the transmission shaft, and the connecting sleeve is sleeved on an outer ring of the first bearing.

Optionally, the connecting sleeve is provided with a limiting hole, and the transmission shaft is provided with an insertion hole; and the transmission component further includes a fixed collar and a latch, the fixed collar is fastened to the upper cover, the fixed collar is sleeved on the connecting sleeve, the latch is fastened to the fixed collar, and the latch passes through the limiting hole and then is inserted into the insertion hole, so that the upper cover and the transmission shaft rotate synchronously.

Optionally, the transmission component further includes a second bearing, an inner ring of the second bearing is sleeved on the connecting sleeve, and the fixed collar is sleeved on an outer ring of the second bearing.

Optionally, the fixed collar is provided with a first through hole and a screw hole; and the latch includes a latch rod, a latch cap and a bolt, the latch cap is fastened to an end of the latch rod, the latch cap is provided with a second through hole, the latch rod sequentially passes through the first through hole and the limiting hole and then is inserted into the insertion hole, and the bolt passes through the second through hole and then is screwed to the screw hole.

Optionally, the transmission component further includes a third bearing, and the third bearing is disposed between the transmission shaft and the connecting sleeve.

Optionally, there are two second bearings, the two second bearings are arranged at intervals, and the two second bearings are located at two ends of the fixed collar.

Beneficial effects of the embodiments of the present disclosure are as follows: When the unmanned aerial vehicle nest has a power outage or a drive motor fails, a user can use a manual handle to pass through the drive opening to fit with the drive mechanism so that the upper cover rotates relative to the lower shell and the apron is exposed to the outside. The apron is in an open state, and it is convenient for the user to take out or fly the unmanned aerial vehicle from the apron.

It should be noted that, the preferred embodiments of the utility model are given in the specification and the accompanying drawings of the utility model. However, the utility model can be implemented in many different forms and is not limited to the embodiments described in the specification. These embodiments are not used as additional limitations on the content of the utility model, but are provided for the purpose of making understanding of the disclosure of the utility model more thorough and comprehensive. Moreover, the above technical features can be continuously combined with each other to form various embodiments not listed above, which are all deemed to be within the scope of the specification of the utility model. Further, for those of ordinary skill in the art, improvements or changes can be made based on the above description, and all these improvements and changes should fall within the protection scope of the appended claims of the utility model.

What is claimed is:

1. An unmanned aerial vehicle nest, comprising:
   a nest body, comprising a lower shell and an apron, wherein the apron is provided on the lower shell, the apron is configured to park an unmanned aerial vehicle, and the lower shell is provided with a drive opening;
   an upper cover, rotatably connected to the lower shell; and
   a drive mechanism, configured to drive the upper cover to rotate relative to the lower shell, wherein when the upper cover is at a first preset position, the upper cover covers the apron, and the drive mechanism makes the upper cover stay at any position in a rotation direction of the upper cover, wherein the drive mechanism comprises a drive motor and a transmission component, wherein the drive motor is provided in the lower shell, wherein
   a first end of a drive shaft of the drive motor is connected to the transmission component, a second end of the drive shaft of the drive motor extends away from the transmission component, the second end of the drive shaft of the drive motor corresponds to the drive opening, the transmission component is connected to the upper cover, and the drive motor is configured to drive the transmission component to rotate, so that the transmission component drives the upper cover to rotate relative to the lower shell.

2. The unmanned aerial vehicle nest according to claim 1, wherein an end portion of the second end of the drive shaft of the drive motor is provided with a fitting structure, and the fitting structure is configured to drive the transmission component to move.

3. The unmanned aerial vehicle nest according to claim 2, wherein the lower shell comprises a flange piece; and the transmission component comprises a transmission shaft, a worm gear and a worm screw, the transmission shaft is rotatably connected to the flange piece, the worm gear is fastened to the transmission shaft, the upper cover is fastened to the transmission shaft, the worm screw is fastened to an end of the drive shaft of the drive motor, and the worm gear meshes with the worm screw.

4. The unmanned aerial vehicle nest according to claim 3, wherein the nest body comprises a bracket, a connecting sleeve and a first bearing, two ends of the connecting sleeve are connected to the bracket and the lower shell respectively, an inner ring of the first bearing is sleeved on the transmission shaft, and the connecting sleeve is sleeved on an outer ring of the first bearing.

5. The unmanned aerial vehicle nest according to claim 4, wherein
   the connecting sleeve is provided with a limiting hole, and the transmission shaft is provided with an insertion hole; and
   the transmission component further comprises a fixed collar and a latch, the fixed collar is fastened to the upper cover, the fixed collar is sleeved on the connecting sleeve, the latch is fastened to the fixed collar, and the latch passes through the limiting hole and then is inserted into the insertion hole, so that the upper cover and the transmission shaft rotate synchronously.

6. The unmanned aerial vehicle nest according to claim 5, wherein the transmission component further comprises a second bearing, an inner ring of the second bearing is sleeved on the connecting sleeve, and the fixed collar is sleeved on an outer ring of the second bearing.

7. The unmanned aerial vehicle nest according to claim 5, wherein
   the fixed collar is provided with a first through hole and a screw hole; and
   the latch comprises a latch rod, a latch cap and a bolt, the latch cap is fastened to an end of the latch rod, the latch cap is provided with a second through hole, the latch rod passes through the limiting hole and then is inserted into the insertion hole, and the bolt passes through the second through hole and then is screwed to the screw hole.

8. The unmanned aerial vehicle nest according to claim 5, wherein
   the transmission component further comprises a third bearing, and the third bearing is disposed between the transmission shaft and the connecting sleeve.

9. The unmanned aerial vehicle nest according to claim 6, wherein
   there are two second bearings, the two second bearings are arranged at intervals, and the two second bearings are located at two ends of the fixed collar.

10. A control method for an unmanned vehicle nest, comprising
    obtaining a flight instructions for an unmanned vehicle;
    allowing the unmanned vehicle exit the unmanned vehicle nest when the drive motor open the unmanned vehicle nest;
    wherein in response to the drone nest has a power outage or the drive motor fails, a user manually opens the drone nest, wherein
    the unmanned aerial vehicle nest, comprising:
    a nest body, comprising a lower shell and an apron, wherein the an apron is provided on the lower shell, the apron is configured to park the an unmanned aerial vehicle, and the lower shell is provided with a drive opening;
    an upper cover, rotatably connected to the lower shell; and
    a drive mechanism, configured to drive the upper cover to rotate relative to the lower shell, wherein when the upper cover is at a first preset position, the upper cover covers the apron, and the drive mechanism makes the upper cover stay at any position in a rotation direction of the upper cover, wherein a first end of a drive shaft of the drive motor is connected to the transmission component, a second end of the drive shaft of the drive motor extends away from the transmission component, the second end of the drive shaft of the drive motor corresponds to the drive opening, the transmission component is connected to the upper cover, and the drive motor is configured to drive the transmission component to rotate, so that the transmission component drives the upper cover to rotate relative to the lower shell.

* * * * *